United States Patent [19]
Schalles

[11] Patent Number: 5,170,686
[45] Date of Patent: Dec. 15, 1992

[54] TURNING MACHINE

[75] Inventor: Erhard Schalles, Bielefeld, Fed. Rep. of Germany

[73] Assignee: Gildemeister Aktiengesllschaft, Bielefeld, Fed. Rep. of Germany

[21] Appl. No.: 720,730

[22] Filed: Jun. 25, 1991

[30] Foreign Application Priority Data

Jul. 24, 1990 [DE] Fed. Rep. of Germany ....... 4023453

[51] Int. Cl.$^5$ .............................................. B23B 7/02
[52] U.S. Cl. ........................................ 82/142; 82/147; 29/374
[58] Field of Search ................ 82/118, 119, 120, 129, 82/146, 142, 147, 1.11; 29/27 C, 36, 37 R, 37 A

[56] References Cited

U.S. PATENT DOCUMENTS

| 4,413,539 | 11/1983 | Ishizuka et al. | 29/36 X |
| 5,036,735 | 8/1991 | Vakhidov et al. | 82/142 |

FOREIGN PATENT DOCUMENTS 0226832 7/1987 European Pat. Off. .
613702 5/1935 Fed. Rep. of Germany .
3041171 5/1981 Fed. Rep. of Germany .

*Primary Examiner*—Z. R. Bilinsky
*Attorney, Agent, or Firm*—Michael J. Striker

[57] ABSTRACT

A turning machine has a spindle box, a workpiece spindle rotatably supported in the spindle box and having at its on end a clamping device for clamping rod-shaped workpieces, a tool holder arranged displaceably transversely to an axis of the workpiece spindle, a guiding bushing support, and a workpiece guiding bushing rotatably supported in the guiding bushing support so that the guiding bushing is oriented coaxially with the axis of the workpiece spindle and exchangeably mounted in the guiding bushing support. The workpiece spindle displaces the guiding bushing in the direction of the axis of the workpiece spindle. The workpiece spindle is sleeve-shaped and extends out of the spindle box over at least a length of the relative movement. The workpiece guiding bushing is exchangeable by the workpiece spindle guiding bushing for receiving the sleeve-shaped workpiece spindle.

10 Claims, 4 Drawing Sheets

TURNING MACHINE

BACKGROUND OF THE INVENTION present invention relates to a turning machine or a lathe. In particular, it relates to such a turning machine which has a spindle box which rotatably supports a workpiece spindle provided with a clamping device for clamping rod-shaped workpieces, a tool support which displaces transverse to the workpiece spindle axis, a workpiece guiding bushing rotatably supported in guiding bushing support so that the guiding bushing extends coaxially to the workpiece spindle axis and mounted exchangeably in the guiding bushing support, and displacement means for relative displacement of the workpiece spindle in the guiding bush in the axial direction of the workpiece spindle.

Turning machines of the above mentioned type are known in the art. One of such turning machines is disclosed for example in the German document DE-A 3,041,171. Such a turning machine serves for working of long, thin workpieces which have a tendency to bending under the action of the cutting pressure. For this purpose a guiding bushing is provided on the longitudinal carriage and supports the workpiece during the working with the tools arranged on a transverse carriage of the longitudinal carriage near its engaging point. The guiding bushing surrounds the workpiece in its unworked region. A return movement of the longitudinal carriage during the working or a repeated working of the same workpiece region is not possible in this machine, since the workpiece diameter reduced by the working can no longer be supported by the guiding bush. The guiding bushes can be exchanged for adapting to the workpiece rods with different diameters.

The European Patent Document EP-A 226,836 discloses a turning machine with a stationary spindle stock and the guiding bush movable on the longitudinal carriage for a material removing only near the spindle box, and the guiding bush is spaced from the guiding bush support. It provides for a normal turning working for short parts. Since the guiding bushing support however remains on the machine due to the fact that it simultaneously forms the tool support, the tools can not directly engage the workpiece clamping parts. The working accuracy however decreases depending on the increase in the distance between the tool cutting point from the workpiece clamping region.

SUMMARY OF THE INVENTION

Accordingly, it is an object of the present invention to provide a turning machine which avoids the disadvantages of the prior art.

In keeping with these objects and with others which will become apparent hereinafter, one feature of the present invention resides, briefly stated, in a turning machine in which the workpiece spindle is sleeve-shaped and extends out of the spindle box at least by the length of the relative displacement, and the workpiece guiding bushing is exchangeable by a workpiece spindle guiding bushing for receiving the sleeve-shaped working spindle.

With the utilization of the workpiece guiding bushing a conventional working is achieved with the long turning machine in which the workpiece is supported in the vicinity of the tool engaging point in the guiding bush. For workpieces which must be worked without additional support, the workpiece spindle is exchanged by a workpiece spindle guiding bush with its workpiece spindle head which faces the working region. The working spindle is supported and centered in the guiding bushing support. Thereby also during normal turning working a high working accuracy is obtained. This type of working is used for short and rigid workpieces.

The present invention can be used so that the turning machine can be utilized with different working spindles and a stationary guiding bushing support, and also a turning machine with stationary work spindle and a guiding bushing support displaceable in the axial direction of the spindle.

The guiding accuracy is obtained when the guiding bush is supported in a guiding spindle, in accordance with another feature of the present invention.

When the working spindle guided in a guiding bushing is joined through a bearing collar the accuracy is increased due to a definite bearing point between the guiding bush and the working spindle.

The working accuracy is also increased when the guiding bush abuts with a prestressing force against the workpiece or against the workpiece spindle. Therefore the play between the guiding and guided elements is reduced. In the case of the guiding bush for the workpiece, the diameter deviations of the initial material are compensated.

The total length of the arrangement is reduced when the workpiece spindle extends into a guiding bushing driver, in accordance with still a further embodiment of the present invention.

During working of the workpieces frequently cutting and cooling fluids are utilized which can flow into the guiding bushing. For preventing further penetration of the liquid, a ring chamber is provided behind the guiding bushing to catch the liquid. Due to the rotation it is transported outwardly, where it is returned to the working chamber through a passage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
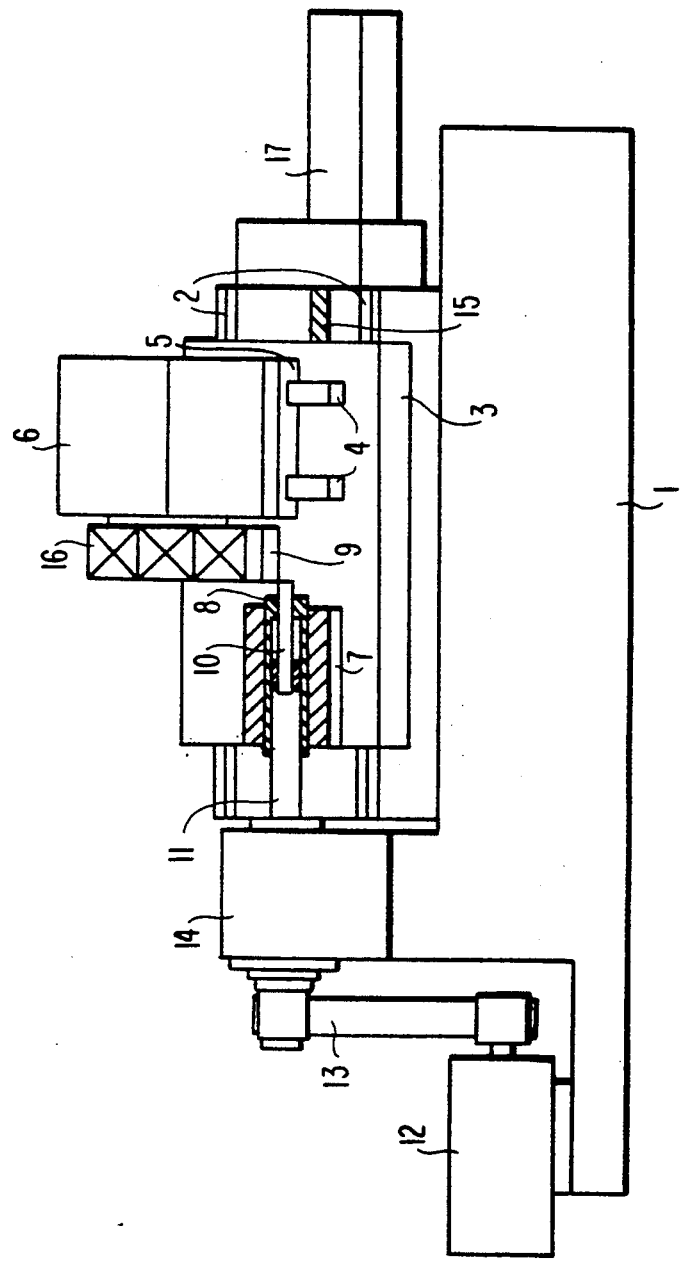
FIG. 1 is a general view of a turning machine in accordance with the present invention.

The turning machine in accordance with the present invention has a bed which is identified with reference numeral 1 and provided with guiding tracks 2 for a longitudinal carriage 3. The longitudinal carriage 3 has guiding tracks 4 for plan carriage 5 which receives a tool support 6. The tool support is formed as a tool revolver 16.

A guiding bushing support 7 is arranged also on the longitudinal carriage 3. A guiding bushing 8 is rotatably supported on the guiding bushing support 7. A workpiece rod 10 to be worked with tools 9 is guided in the guiding bushing 8. It is rotatably driven by the workpiece spindle 11. The drive is performed by a drive motor 12 through a belt transmission to the rear end of the workpiece spindle 11 supported in a spindle box 14. For the feeding of the longitudinal and plan carriages 3 and 5, known feed drives 17 and threaded spindles 15 are provided.

The turning machine in accordance with the present invention also has a longitudinally displaceable spindle box, a stationary backrest part, and a tool support which is displaceable only in the plan direction.

Figure 2:
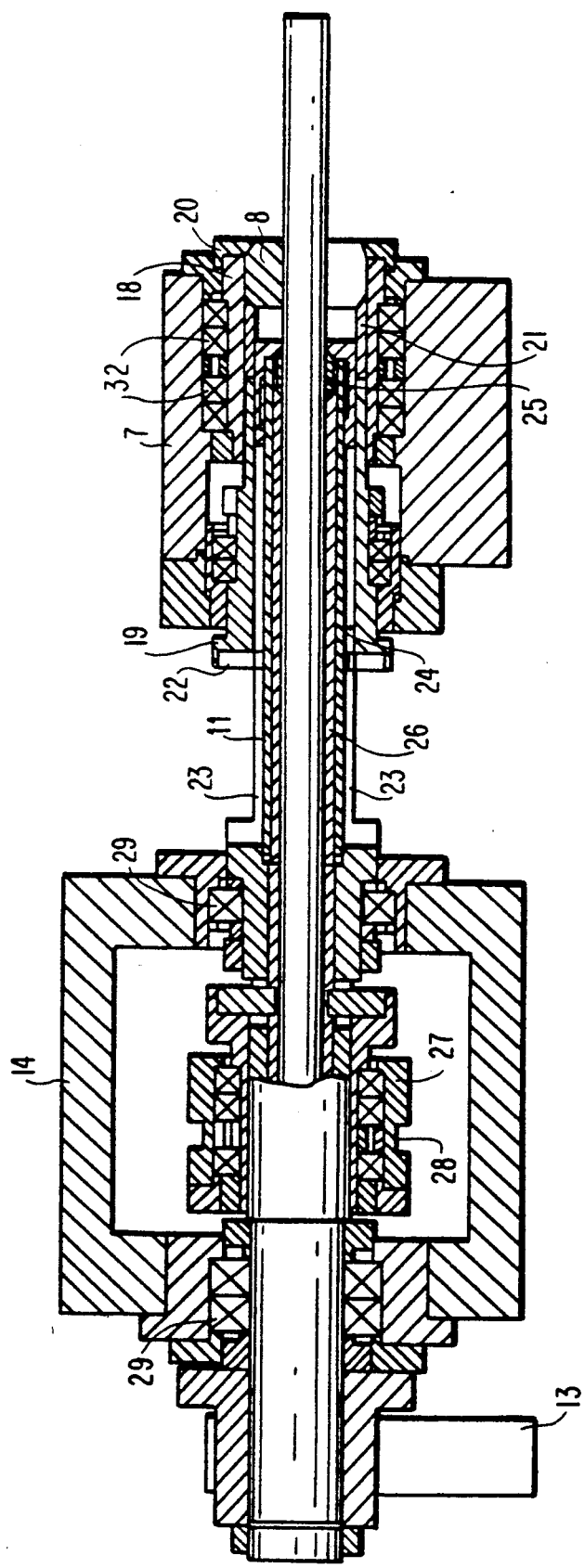
FIG. 2 is a partial view of the turning machine in accordance with a long turning embodiment, in accordance with the present invention.

FIG. 2 shows the workpiece spindle 11 and the workpiece guiding device of the inventive turning machine in the longitudinal turning arrangement. A guiding spindle 11 is rotatably supported in the guiding bushing support 7 by means of roller bearing 32. A guiding bushing driver 19 is located in the guiding spindle 18. The guiding bushing driver 19 clamps the workpiece guiding bushing 18 between a cover 20 which closes the guiding spindle 18 and a clamping cone 21 which abuts with its inner cone against a counter surface of the workpiece guiding bushing 8. The clamping applies a radially directed force to the workpiece guiding bushing 8 which provides a pretensioning of the workpiece rod 10 so that it can be displaced axially and at the same time is held radially without play.

The guiding bushing driver 19 carries a driver 22 at its end which faces away of the guiding bushing 8. The driver 22 engages in guiding grooves 23 of the tool spindle 11. Thereby the guiding bushing driver 19 and the guiding spindle 18 are synchronously rotatably driven by the workpiece spindle 11 but can displace relative to one another in the direction of the spindle axis. The guiding bushing driver 19 is provided with an expanded opening 24 very close to the workpiece guiding bushing 8. The sleeve-shaped workpiece 11 can extend into the opening 24.

The workpiece spindle 11 is provided at its right end with a collet 25 which holds the workpiece rod 10. The collet 25 is actuated by a clamping tube 26 and a bush 27 which can be axially displaced through a driver nut 28. For example a pin of a hydraulic linear drive can engage in the driver nut 28. The workpiece spindle 11 is rotatably supported in the spindle box 14 by roller bearings 29.

Figure 3:
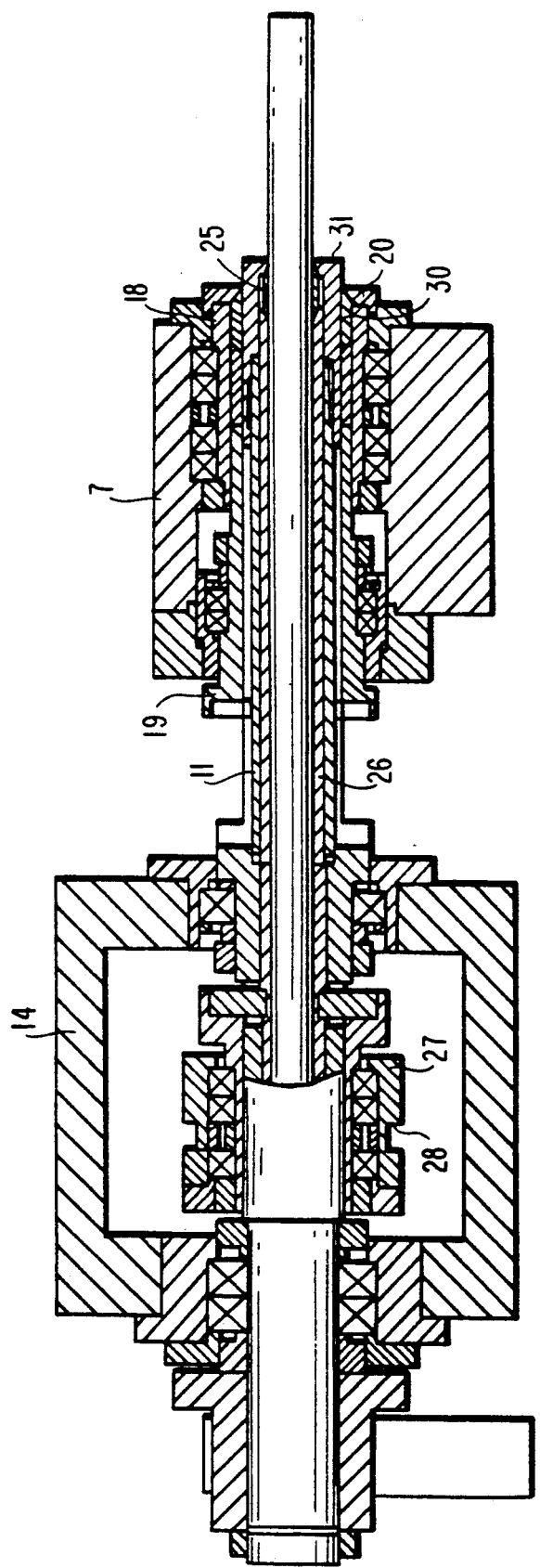
FIG. 3 is a partial view of a turning machine with a short turning embodiment, in accordance with the present invention.

FIG. 3 shows the relevant part of the turning machine which is formed as a short turning automatic machine. The spindle box 14, the workpiece spindle 11, the collet 25 and the collet actuating device 26, 27, 28 are identical to those of the embodiment of FIG. 2.

A workpiece spindle guiding bushing 30 is held in the guiding bushing support 7 with the guiding spindle 18 by the cover 20 and the guiding bushing holder 19. The workpiece spindle guiding bushing 30 receives a head 31 of the workpiece spindle 11.

For the conversion from the long turning embodiment to the short turning embodiment with the inventive turning machine, the exchange of the guiding bushings 8 and 30 is required.

Due to the significant difference in the diameter, it can be advantageous to receive the workpiece guiding bushing 8 in a reducing sleeve. The workpiece spindle 11 can extend out of the workpiece spindle guiding bushing so far that its reliable guidance remains ensured.

Figure 4:
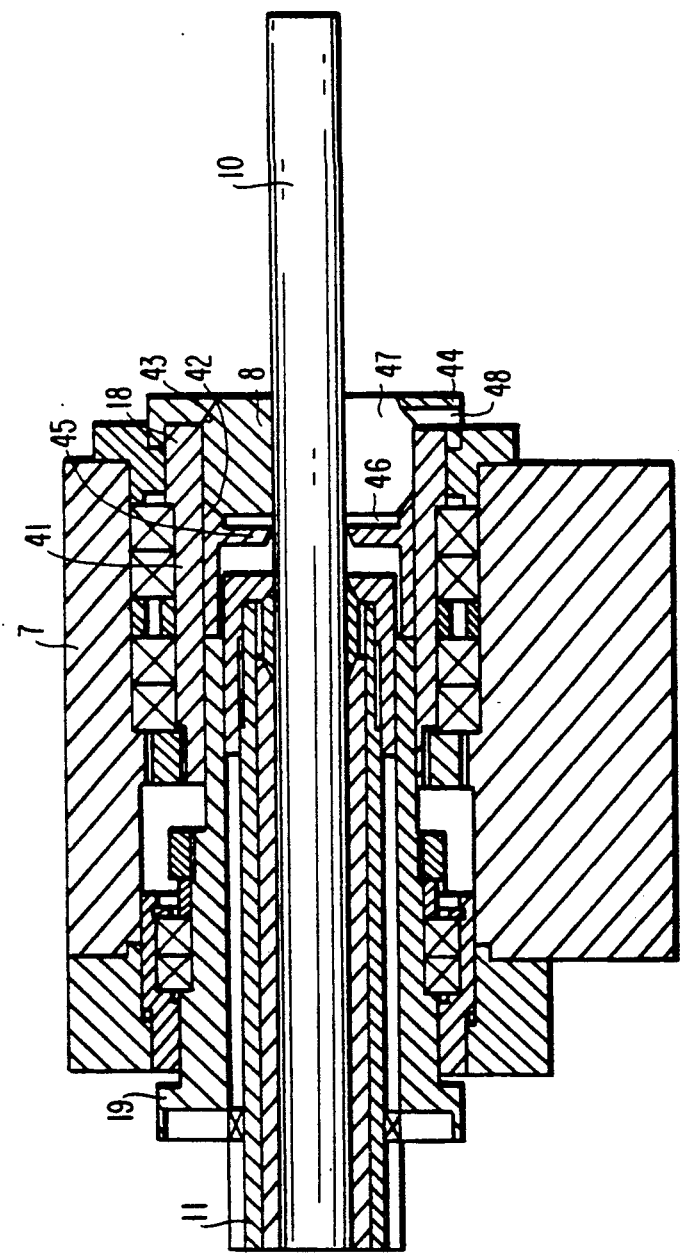
FIG. 4 is a view showing a guiding bushing support for a long turning embodiment in section.

FIG. 4 shows a somewhat different modification of the guiding bushing holder 7 in the long turning embodiment. A clamping cone 41 supported in the guiding spindle 18 crosses the guiding bushing 8 against the workpiece rod 10 through its inner cone 42 and an inner cone 43 in the cover 44 when it is axially loaded by the guiding bushing driver 19. The clamping cone 41 is provided with a baffle disc 45 which forms a ring chamber 46 between the guiding bushing 8 and the baffle disc 45. Cutting or cooling liquid accumulates in the ring chamber 46 and is withdrawn through a slot 47 of the guiding bush 8 and a cooling medium passage 48 in the cover 44. The workpiece spindle 11 and the bearing region of the guiding spindle 18 are therefore protected from the cooling medium.

The proposed embodiment however requires that during the conversion from the long turning to the short turning, not only the guiding bushing 8 rotates but also the clamping cone 41 must be exchanged.

It will be understood that each of the elements described above, or two or more together, may also find a useful application in other types of constructions differing from the types described above.

While the invention has been illustrated and described as embodied in a turning machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A turning machine, comprising a spindle box; a workpiece spindle rotatably supported in said spindle box and having at its one end a clamping device for clamping rod- shaped workpieces; a tool holder arranged displaceably transversely to an axis of said workpiece spindle; a guiding bushing support; a workpiece guiding bushing rotatably supported in said guiding bushing support so that said guiding bushing is oriented coaxially with the axis of said workpiece spindle and exchangeably mounted in said guiding bushing support; displacing means for relatively displacing said workpiece spindle in said guiding bushing in the direction of the axis of said workpiece spindle, said workpiece spindle being sleeve-shaped and extending out of said spindle box over at least a length of the relative movement, and said workpiece guiding bushing being exchangeable by said workpiece spindle guiding bushing for receiving said sleeve-shaped workpiece spindle so that said workpiece guiding bushing and said workpiece spindle guiding bushing may be selectively used to support the workpiece and said workpiece spindle respectively.

2. A turning machine as defined in claim 1, wherein said spindle box is stationary; and further comprising a longitudinal carriage which is displaceable in the direction of the axis of said spindle and is provided with guiding paths for said workpiece holder which displaces in a transverse direction, said guiding bushing support being arranged on said longitudinal carriage.

3. A turning machine as defined in claim 1; and further comprising a guiding spindle, both said workpiece guiding bushing and said workpiece spindle guiding bushing with said guiding spindle being rotatably supported in said guiding bushing support.

4. A turning machine as defined in claim 1, wherein said sleeve-shaped workpiece spindle has an extending end and is provided at said extending end with a guiding collar.

5. A turning machine as defined in claim 1; and further comprising a clamping cone and a closing cover, said guiding bushing being clamped between said clamping cone and said closing cover.

6. A turning machine as defined in claim 5; and further comprising a guiding bushing driver clamping said guiding bushing between said clamping cone and said closing cover.

7. A turning machine as defined in claim 1; and further comprising a guiding bushing driver, said sleeve-shaped working spindle being movable at least partially in said guiding bushing driver.

8. A turning machine as defined in claim 3; and further comprising a roller bearing supporting said guiding spindle and said guiding bushing holder.

9. A turning machine as defined in claim 5, wherein said workpiece guiding bushing is pressed with a pre-stressing against the workpiece.

10. A turning machine as defined in claim 1; and further comprising a working chamber; a cooling medium passage; and a ring groove provided between said workpiece spindle and said workpiece guiding bushing, and connected with said working chamber through said cooling medium passage.

* * * * *